(12) United States Patent
Bremer

(10) Patent No.: US 8,516,277 B2
(45) Date of Patent: Aug. 20, 2013

(54) METHOD FOR OPERATING A CONTROL COMPUTER

(75) Inventor: Klaus Bremer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 425 days.

(21) Appl. No.: 12/783,151

(22) Filed: May 19, 2010

(65) Prior Publication Data

US 2010/0299546 A1 Nov. 25, 2010

(30) Foreign Application Priority Data

May 20, 2009 (EP) ..................................... 09160798

(51) Int. Cl.
*G06F 1/26* (2006.01)
(52) U.S. Cl.
USPC ........................................................ 713/300
(58) Field of Classification Search
USPC ........................................................ 713/300
See application file for complete search history.

(56) References Cited

U.S. PATENT DOCUMENTS

| 5,424,903 | A | * | 6/1995 | Schreiber | 361/166 |
| 5,530,879 | A | * | 6/1996 | Crump et al. | 713/323 |
| 5,550,649 | A | * | 8/1996 | Wong et al. | 358/479 |
| 6,023,399 | A | * | 2/2000 | Kogure | 361/23 |
| 7,181,746 | B2 | * | 2/2007 | Perycz et al. | 719/310 |
| 7,363,521 | B1 | | 4/2008 | Mehan | |

FOREIGN PATENT DOCUMENTS

JP 2002-142047 5/2002

OTHER PUBLICATIONS

"Embedded und PC-based Automation", Siemens-Katalog ST PC, Edition Nov. 2008, Chapters 2 and 3 (113 pages).

* cited by examiner

*Primary Examiner* — Kim Huynh
*Assistant Examiner* — Eric Chang
(74) *Attorney, Agent, or Firm* — Cozen O'Connor

(57) ABSTRACT

A method for operating a control computer connected to a system to be controlled. The system is connected to a power supply line by a first switch, with the control computer being shut down by execution of a control command to enter an idle state. An uncoordinated switching of the control computer and the system is thereby avoided and operational reliability is increased.

6 Claims, 3 Drawing Sheets

METHOD FOR OPERATING A CONTROL COMPUTER

BACKGROUND OF THE INVENTION

1. Field of the Invention

The invention relates to control systems, and more particularly, to a method for operating a control computer. The invention also relates to an arrangement configured to implement the method.

2. Description of the Related Art

Siemens catalogue ST PC, edition November 2008, chapters 2 and 3, discloses industrial PCs, such as control computers, which are provided to solve different automation problems. An industrial PC of this type is usually connected to a system to be controlled, where the industrial PC and the system is connected to a suitable power supply by a line. The industrial PC is switched off in a software-controlled manner which is known per se, by at least one instruction initially being selected and activated by mouse entry or by execution of a control command, as a result of which the industrial PC shuts down automatically. During shut-down, the operating system of the industrial PC terminates running programs, stores data or user settings to be stored on the hard disc or deactivates device drivers. After a shut-down of this type, the industrial PC remains in an idle state or, depending on specifications and settings of a user, the operating system of the industrial PC, in cooperation with corresponding hardware means, automatically switches off the power supply of the industrial PC.

The situation may now arise in which a user not only switches off the system, but instead, as a result of carelessness, switches off the system together with the industrial PC by separating both the system and the industrial PC from the power supply line by a switch. Here, the industrial PC is switched off manually and can no longer shut down correctly. As a result, data can be lost, or a new installation of the operating system of the PC or of a user program may be necessary when the PC is switched on again. To prevent this, the PC can be provided with an "uninterruptible power supply" (UPS), which maintains power to the PC for the duration of the shut-down after the supply voltage has been switched off. An "uninterruptible power supply" of this type requires regular maintenance, within the scope of which accumulators usually have to be replaced.

SUMMARY OF THE INVENTION

It is therefore an object of the present invention to provide an improved method for controlling the shut-down of a computer. It is also an object of the invention to provide an arrangement configured to implement the method.

This and other objects and advantages are achieved in accordance with the invention by a method in which a control command is executed, if a first switch is opened for separation from the supply line, and/or during shut-down of a control computer, a second switch, which is controllable by the control computer is opened to separate a system from a power supply line.

The objects and advantages in accordance with the invention are also achieved by an arrangement in which the control computer is configured to execute the control command if the control computer identifies that the first switch is opened for separation from the power supply line and/or is configured to open a second, controllable switch to separate the system from the power supply line during the shut-down.

In accordance with the invention, uncoordinated switching of the control computer and the system is advantageously avoided and operational reliability is increased. Furthermore, it is possible to dispense with the use of an "uninterruptible power supply", as a result of which the project planning outlay is reduced.

In an embodiment of the invention, the control computer is configured to automatically switch on again, if the first switch is closed and/or the second, controllable switch is closed during the start-up (boot-up) of the control computer. As a result, a coordinated restart of the control computer and the system is enabled.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments and advantages are explained in more detail below with reference to the drawings, in which exemplary embodiments of the invention are illustrated, in which.

DETAILED DESCRIPTION OF THE PRESENTLY PREFERRED EMBODIMENTS

Figure 1:
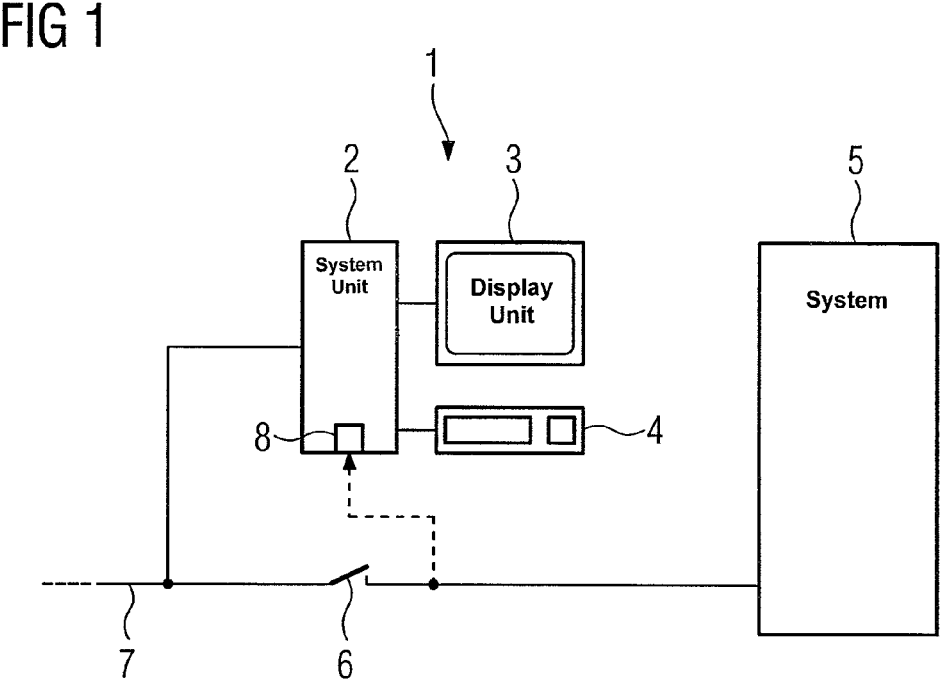
FIGS. 1 to 3 show arrangements with a control computer and a system to be controlled in accordance with exemplary embodiments of the invention.
Figure 2:
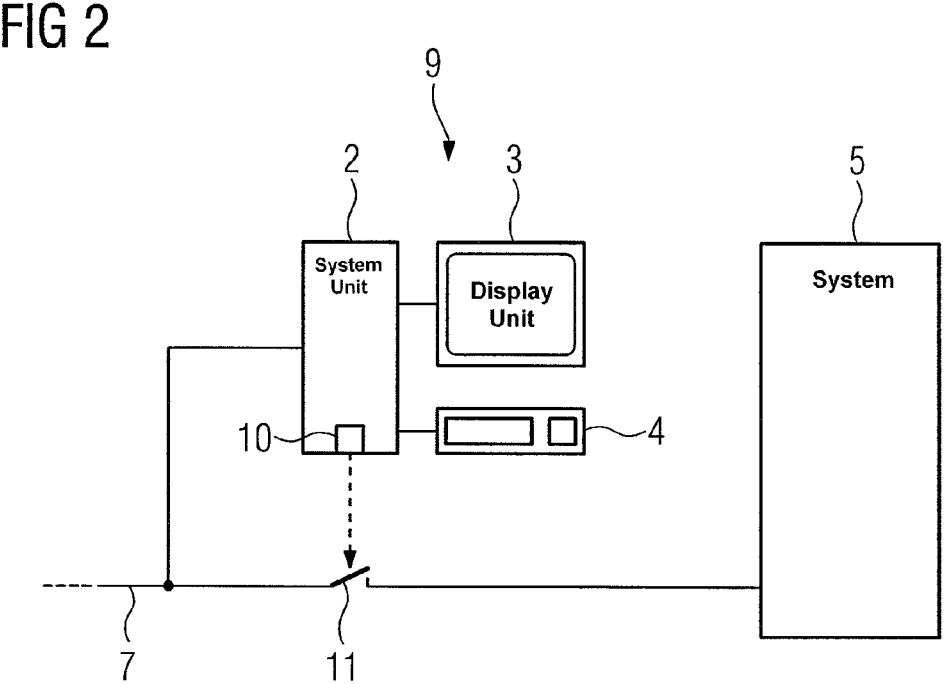
Figure 3:
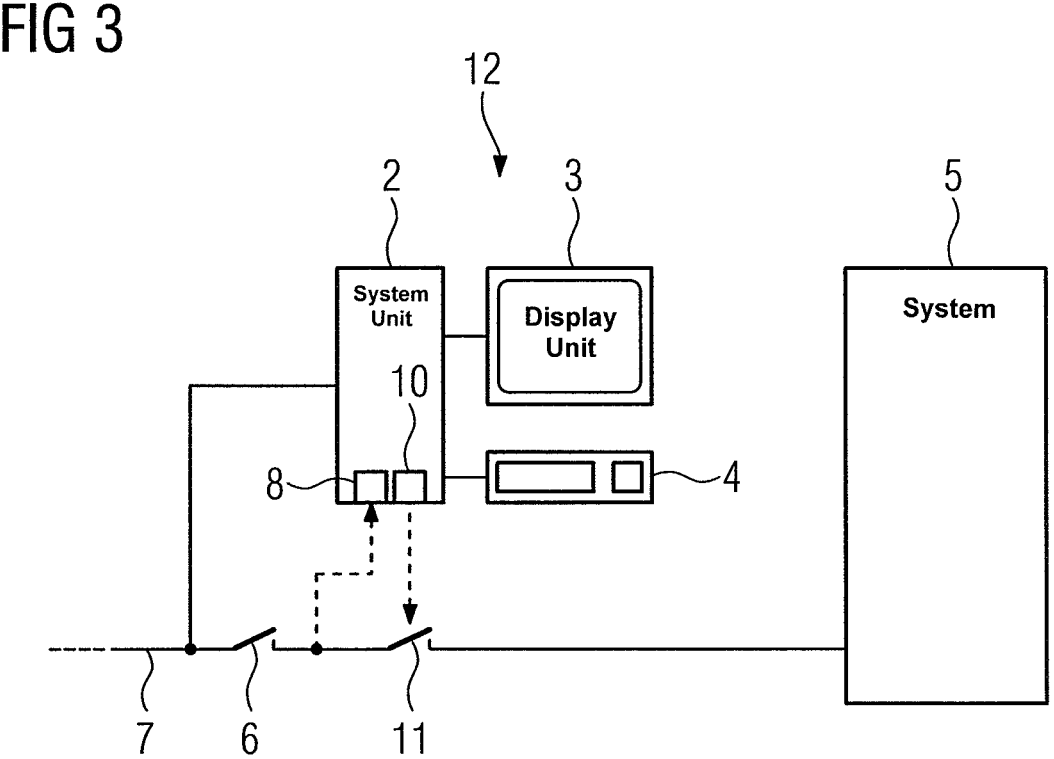

The same parts shown in FIGS. 1 to 3 are provided with the same reference characters.

FIG. 1 shows a control computer 1 having a system unit 2, a display unit 3 and an input unit 4. Further hardware device, such as a further input unit comprising a mouse, can naturally be connected to the system unit 2. The system unit 2 is provided to receive plug-in cards in a motherboard and/or a circuit board of the system unit 2, such as plug-cards comprising a CPU plug-in card, a plug-in card for realizing an Ethernet or field bus communication, a plug-in card for an analog and/or digital input and/or output, or other plug-in card suited to operating the control computer 1. The control computer 1 is provided to control a system 5, such as a system or plant comprising an automobile engine test bench or a hydraulic molding press. Here, the control computer 1 is connected to this system through a control and communication connection (not shown here). The system 5 to be controlled is directly connected to a power supply line 7 by a first switch 6 and the control computer 1, with an input circuit of the control computer 1 detecting at an input 8 whether the system 5 is supplied with a corresponding voltage by the power supply line 7 or whether a voltage is actually present on the power supply line 7.

It is assumed in the following description that by opening the first switch 6, an operator will switch off the system 5. As a result, the system 5 is separated from the power supply line 7. Here, the system 5 will not switch on any supply voltage and the control computer 1 therefore does not detect any voltage by its input 8. As a result of the control computer 1 not detecting any voltage, the input circuit of the control computer 1 transmits a control command to the operating system or the BIOS (Basic Input Output System) of the control computer to shut down the control computer 1, such that the control computer 1 shuts down in a manner known per se and remains in an idle state, with the input circuit in this idle state also having a sufficient voltage level for monitoring the power supply line 7 to which it is connected. Due to the control computer 1 being shut down as a result thereof, and the system 5 being separated from the power supply line 7, a coordinated switching of the system 5 and the control computer 1 is effected.

The control computer 1 is re-activated and leaves its idle state if the operator re-closes the first switch 6. The input circuit of the control computer 1 detects a voltage on the power supply line 7 using the input 8. As a result of this detected voltage, the control computer 1 leaves its idle state due to the input circuit of the control computer 1 supplying a start-up (boot-up) command to the operating system or the BIOS. A coordinated switching of the system 5 and the control computer 1 is also effected in this case.

To switch the system 5 by a control computer, the control computer 9 of FIG. 2 includes an output circuit with an output 10, by which a second switch 11 is activated. In the event that an operator allows the control computer 9 to shut down, the output circuit of the control computer 9 controls the second switch 11 such that this is opened, as a result of which the system 5 is separated from the power supply line 7 and a corresponding supply voltage is no longer applied to the system 5. Here, the supply voltage is only re-applied to the system 5 if the operator allows the control computer 9 to be re-started, as a result of which the output circuit controls the second switch 11 such that this switch 11 closes.

FIG. 3 shows an embodiment of an arrangement with the system 5 and with a control computer 12, where the input circuit is provided with the input 8 and the output circuit is provided with the output 10. The arrangement also includes the first switch 6 and a second, controllable switch 11, of which the first switch 6 and the input circuit provided with the input 8 are provided to realize the switch 11 described in the embodiment of FIG. 1, and the second controllable switch 11 and the output circuit are provided with the output 10 for realizing the functionality described in the embodiment of FIG. 2.

Figure 4:
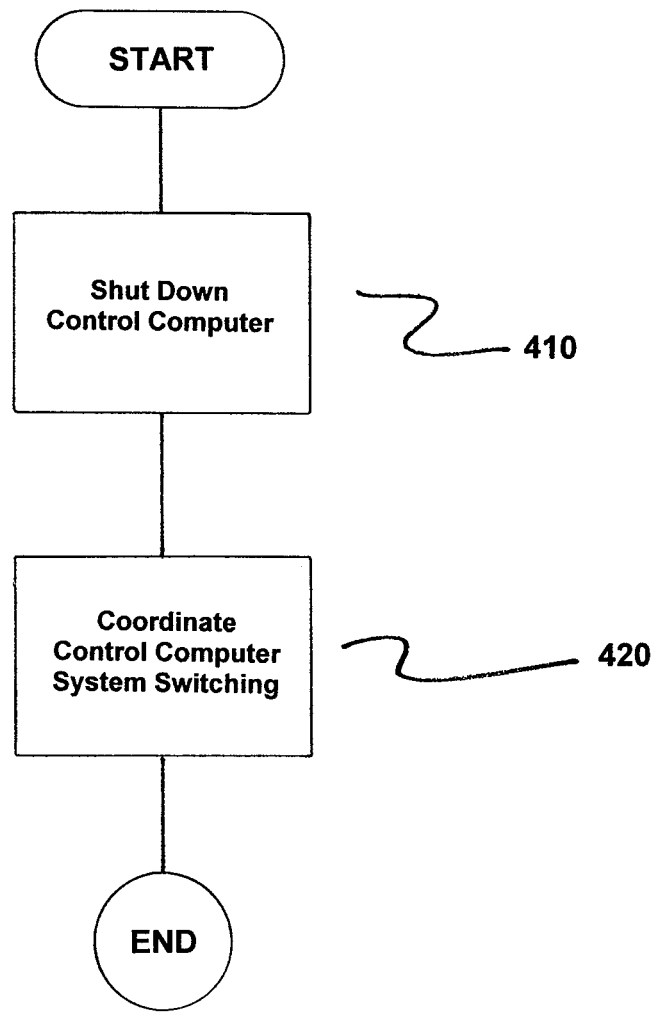
FIG. 4 is a flow chart of the method in accordance with an embodiment of the invention.

FIG. 4 is a flow chart of the method for operating a control computer connected to a system to be controlled in accordance with the invention. Here, the system to be controlled is connected to a voltage supply line by a first switch. The method comprises shutting down the control computer by executing a control command at the control computer and entering an idle state, as indicated in step 410.

The switching of the control computer and the system is coordinated by at least one of executing, at the control computer, the control command if the first switch is opened to separate the system from the voltage supply line and opening, by the control computer, a second switch controllable by the control computer to separate the system from the voltage supply line during the shutting down of the control computer, as indicated in step 420.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A method for operating a control computer connected to a system to be controlled, the system to be controlled being connected to a voltage supply line by a first controllable switch and by a second controllable switch downstream of the first controllable switch, the method comprising:
   shutting down the control computer by executing a control command at the control computer and entering an idle state; and
   coordinating switching of the control computer and the system by:
   executing, at the control computer, the control command if the first controllable switch is opened to separate the system from the voltage supply line; and
   opening, by the control computer, the second controllable switch controllable by the control computer to separate the system from the voltage supply line during the shutting down of the control computer.

2. The method as claimed in claim 1, further comprising:
   automatically restarting the control computer if at least one of the first controllable switch is closed and the second, controllable switch is closed during start-up of the control computer.

3. An arrangement comprising:
   a control computer configured to shut-down and enter an idle state upon execution of a control command;
   a system connected to the control computer for control by the control computer;
   a voltage supply line;
   a first controllable switch connecting the system to the voltage supply line; and
   a second controllable switch downstream of the first controllable switch;
   wherein the control computer is configured to coordinate switching of the control system and the system by executing the control command if the control computer identifies that the first controllable switch is opened to separate the system from the voltage supply line and opening the second controllable switch to separate the system from the voltage supply line during the shut-down of the control computer.

4. The arrangement as claimed in claim 3, wherein the control command forms an integral part of an operating system or a Basic Input Output System (BIOS) of the control computer.

5. The arrangement as claimed in claim 3, wherein the control computer is further configured to at least one of automatically restart if the control computer identifies that the first controllable switch is closed and close the second, controllable switch during the start-up of the control computer.

6. The arrangement as claimed in claim 4, wherein the control command forms an integral part of an operating system or a Basic Input Output System (BIOS) of the control computer.

* * * * *